US010839011B2

United States Patent
Ghezzi et al.

(10) Patent No.: US 10,839,011 B2
(45) Date of Patent: Nov. 17, 2020

(54) APPLICATION PROGRAMING INTERFACE DOCUMENT GENERATOR

(71) Applicant: INTERNATIONAL BUSINESS MACHINES CORPORATION, Armonk, NY (US)

(72) Inventors: Alessandro Ghezzi, Rome (IT); Giuseppe Ciano, Rome (IT); Gianluca Bernardini, Rome (IT); Jon P. Weiser, Austin, TX (US); Matt Hartenbower, Austin, TX (US); Jayashree Ramanathan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 15/956,075

(22) Filed: Apr. 18, 2018

(65) Prior Publication Data
US 2019/0325074 A1  Oct. 24, 2019

(51) Int. Cl.
*G06F 16/00*  (2019.01)
*G06F 16/84*  (2019.01)
(Continued)

(52) U.S. Cl.
CPC ............... *G06F 16/86* (2019.01); *G06F 8/31* (2013.01); *G06F 8/75* (2013.01); *G06F 9/547* (2013.01);
(Continued)

(58) Field of Classification Search
CPC .... G06F 16/22; G06F 16/2379; G06F 16/353; G06F 16/81; G06F 16/901; G06F 16/289;
(Continued)

(56) References Cited

U.S. PATENT DOCUMENTS 7,464,366 B2 * 12/2008 Shukla ............... G06Q 10/0633
717/100
7,599,947 B1 * 10/2009 Tolbert ..................... G06F 16/86
(Continued)

FOREIGN PATENT DOCUMENTS

CN   103049271 A   4/2013
CN   105117233 A   12/2015

OTHER PUBLICATIONS

Li Li et al., "Automated Creation of Navigable REST Services Based on REST Chart", Journal of Advanced Management Science vol. 4, No. 5, Sep. 2016, pp. 385-392.*
(Continued)

*Primary Examiner* — Srirama Channavajjala
(74) *Attorney, Agent, or Firm* — Patrick J. Daughtery; Daugherty & Del Zoppo Co., LPA

(57) ABSTRACT

Aspects generate application programming interface documents, wherein processors are configured to scan application programming interface code from representational state transfer request and from server-side responses, map matching application programming interface language definitions within a formal language definition database to matching language definition code values within the scanned code, and map matching object types within an application programming interface object type database to matching object code values within the scanned code. Aspects build schema definitions for the representational state transfer request that includes the matching application programming interface language definitions and object types in response to determining that the matching language definitions and object types are not included within any existing schema definition; and update existing schema definition in response to determining that the matching language definitions and object types are included within an existing schema definition.

14 Claims, 5 Drawing Sheets

(51) Int. Cl.
- *G06F 8/30* (2018.01)
- *G06F 9/54* (2006.01)
- *G06F 8/75* (2018.01)
- *G06F 16/93* (2019.01)
- *G06F 16/958* (2019.01)
- *G06F 16/28* (2019.01)
- *G06F 16/21* (2019.01)
- *G06F 16/20* (2019.01)

(52) U.S. Cl.
CPC ............ *G06F 16/20* (2019.01); *G06F 16/211* (2019.01); *G06F 16/213* (2019.01); *G06F 16/284* (2019.01); *G06F 16/289* (2019.01); *G06F 16/93* (2019.01); *G06F 16/986* (2019.01)

(58) Field of Classification Search
CPC .... G06F 16/284; G06F 16/951; G06F 16/213; G06F 16/86; G06F 16/93; G06F 16/986; G06F 16/211; G06F 16/20; G06Q 50/01; H04L 41/0233; H04L 41/0253
See application file for complete search history.

(56) References Cited

U.S. PATENT DOCUMENTS

| | | | |
|---|---|---|---|
| 8,756,568 B2 | 6/2014 | Hale et al. | |
| 9,015,730 B1* | 4/2015 | Allen | G06F 9/541 719/310 |
| 9,552,237 B2* | 1/2017 | Biesack | H04L 67/02 |
| 9,946,520 B1* | 4/2018 | Houchard | G06F 8/31 |
| 10,482,261 B2* | 11/2019 | Barouni Ebrahimi | G06F 8/36 |
| 10,545,736 B1* | 1/2020 | Houchard | G06F 8/41 |
| 2004/0068586 A1* | 4/2004 | Xie | H04L 67/2823 709/246 |
| 2008/0201338 A1* | 8/2008 | Castro | G06F 16/288 |
| 2011/0078113 A1* | 3/2011 | Franz | G06F 16/273 707/634 |
| 2011/0302316 A1* | 12/2011 | Chou | H04L 67/14 709/228 |
| 2012/0005241 A1* | 1/2012 | Ortel | G06F 16/212 707/803 |
| 2014/0115017 A1* | 4/2014 | Pasternak | G06F 16/958 707/827 |
| 2014/0156726 A1* | 6/2014 | Bohlmann | H04L 69/18 709/203 |
| 2014/0289702 A1 | 9/2014 | McMahon et al. | |
| 2015/0378994 A1 | 12/2015 | Kaplinger et al. | |
| 2016/0026461 A1 | 4/2016 | Bannister et al. | |
| 2016/0098254 A1* | 4/2016 | Paternostro | G06F 8/35 717/105 |
| 2017/0003960 A1* | 1/2017 | Subramanian | G06F 8/76 |
| 2017/0331850 A1* | 11/2017 | Li | G06F 21/577 |
| 2018/0293386 A1* | 10/2018 | Barouni Ebrahimi | G06F 11/3604 |

OTHER PUBLICATIONS

Peter Mell et al, The NIST Definition of Cloud Computing, National Institute of Standards and Technology, Publication 800-145, 2011, entire document.

* cited by examiner

APPLICATION PROGRAMING INTERFACE DOCUMENT GENERATOR

BACKGROUND

"Hypertext transfer protocol" (HTTP) refers to an application protocol for distributed, collaborative, and hypermedia information systems. HTTP is the foundation of data communication for the "world-wide web," an information space interlinked by hypertext links where documents and other web resources that are identified by unique "uniform resource locators" (URLs) addresses can be accessed, via local area networks (LAN's), wide area networks (WAN), the internet, etc.

"Representational state transfer" (REST) refers to an architectural style that defines a set of constraints and properties based on HTTP. Web services that conform to the REST architectural style, sometimes referred to as "RESTful web services," provide interoperability between computer systems on the Internet. REST-compliant web services allow the requesting systems to access and manipulate textual representations of web resources by using a uniform and predefined set of stateless operations.

"Web resources" refers to objects referenced by their URLs and refer to documents, files or other things or entities that can be identified, named, addressed, or handled on the web. In a RESTful web service, requests made to a resource's URL will elicit a response that may be in "extensible markup language" (XML), "hypertext markup language" (HTML), "JavaScript® object notation" (JSON), or some other format. (JAVASCRIPT is a trademark of Oracle Corporation in the United States or other countries.) The response may confirm that some alteration has been made to the stored resource, and the response may provide hypertext links to other related resources or collections of resources. HTTP operations include GET, POST, PUT, DELETE, and other predefined "create, read, update and delete" (CRUD) HTTP methods, which are sometimes referred to as the four basic functions of persistent storage. By using a stateless protocol and standard operations, REST systems reuse components that can be managed and updated without affecting the system as a whole, even while it is running, enabling fast performance, reliability, and scalability.

An "application programming interface" (API) is a set of subroutine definitions, protocols, and tools for building application software that provide a set of clearly defined methods of communication between various software components. API may be created for use with a web-based system, operating system, database system, computer hardware or software library. An API specification can take many forms, but often includes specifications for routines, data structures, object classes, variables or remote calls. Documentation for an API is usually provided to facilitate usage, and illustrative but not limiting or exhaustive examples of API's include "Portable Operating System Interface" (POSIX), "Windows® API" and "Advanced SCSI Programming Interface" (ASPI). (WINDOWS is a trademark of the Microsoft Corporation in the United States or other countries.)

SUMMARY

In one aspect of the present invention, a computerized method for an application programming interface document generator includes executing steps on a computer processor. Thus, a computer processor is configured to scan application programming interface code from representational state transfer request and from server-side responses, map matching application programming interface language definitions within a formal language definition database to matching language definition code values within the scanned code, and map matching object types within an application programming interface object type database to matching object code values within the scanned code. The processor is configured to build schema definitions for the representational state transfer request that includes the matching application programming interface language definitions and object types in response to determining that the matching language definitions and object types are not included within any existing schema definition; and to update existing schema definition in response to determining that the matching language definitions and object types are included within an existing schema definition.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to scan application programming interface code from representational state transfer request and from server-side responses, map matching application programming interface language definitions within a formal language definition database to matching language definition code values within the scanned code, and map matching object types within an application programming interface object type database to matching object code values within the scanned code. The processor is configured to build schema definitions for the representational state transfer request that includes the matching application programming interface language definitions and object types in response to determining that the matching language definitions and object types are not included within any existing schema definition; and to update existing schema definition in response to determining that the matching language definitions and object types are included within an existing schema definition.

In another aspect, a computer program product for an application programming interface document generator has a computer-readable storage medium with computer readable program code embodied therewith. The computer readable hardware medium is not a transitory signal per se. The computer readable program code includes instructions for execution which cause the processor to scan application programming interface code from representational state transfer request and from server-side responses, map matching application programming interface language definitions within a formal language definition database to matching language definition code values within the scanned code, and map matching object types within an application programming interface object type database to matching object code values within the scanned code. The processor is further caused to build schema definitions for the representational state transfer request that includes the matching application programming interface language definitions and object types in response to determining that the matching language definitions and object types are not included within any existing schema definition; and to update existing schema definition in response to determining that the matching language definitions and object types are included within an existing schema definition.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
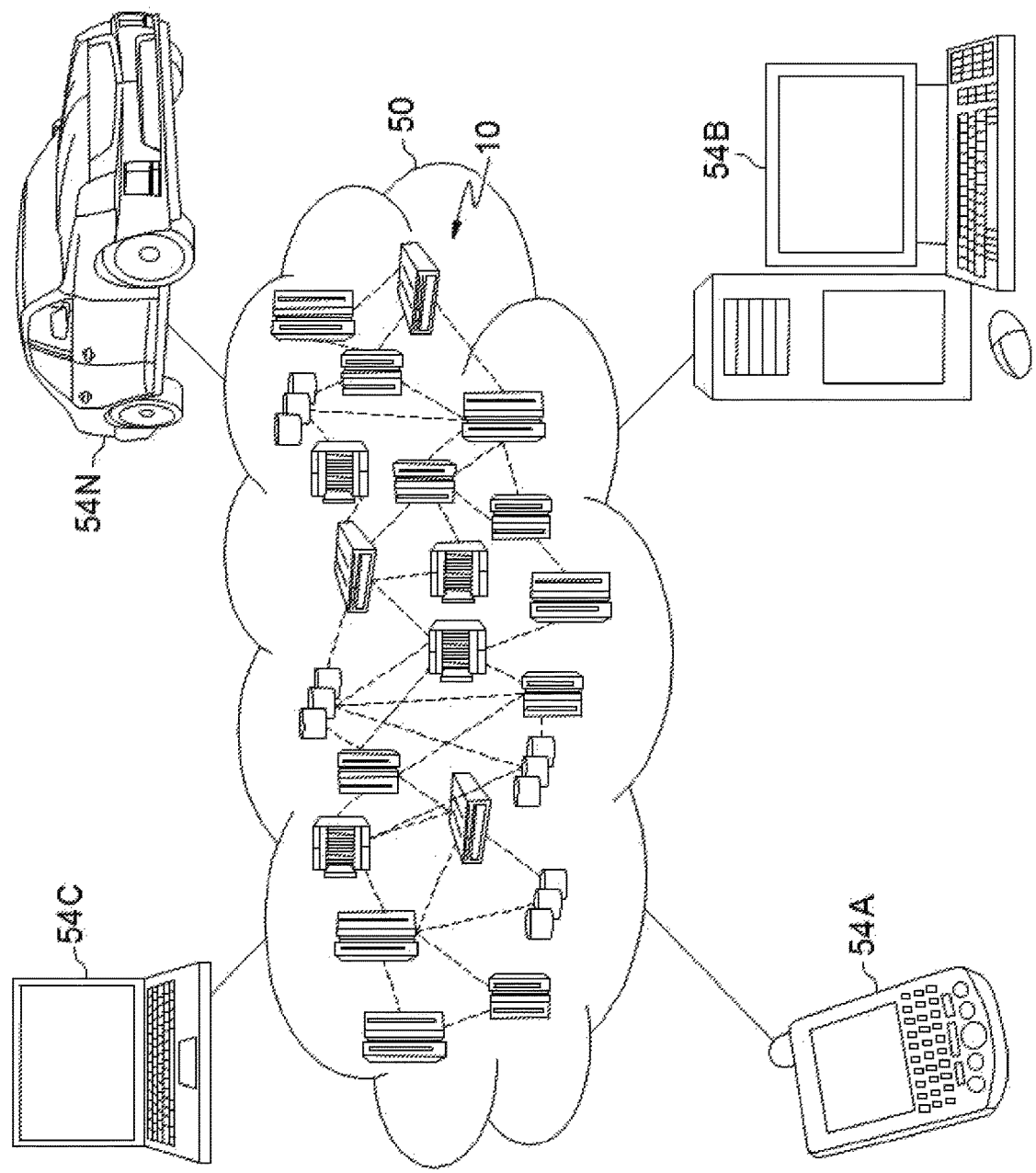
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
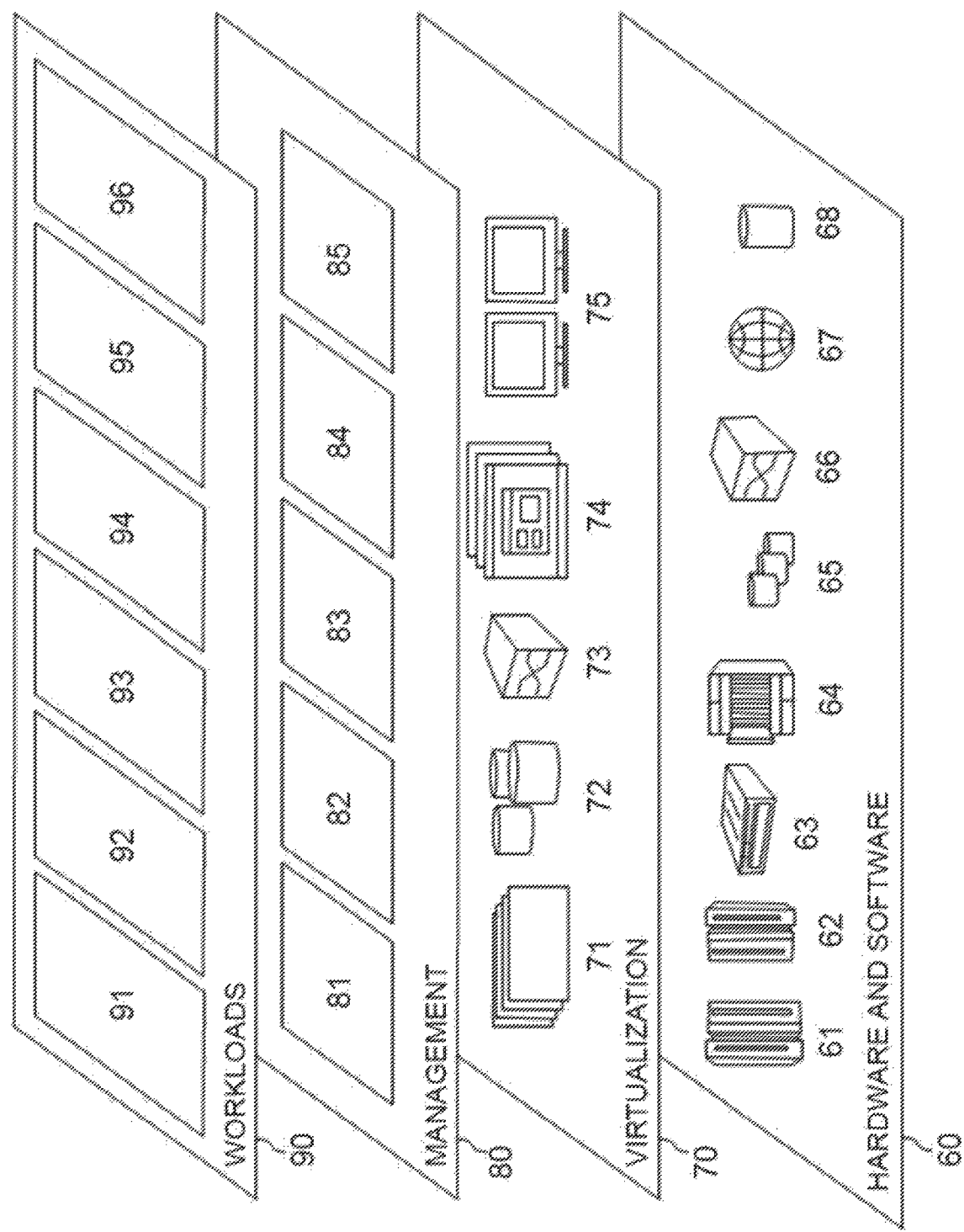
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for an application programming interface document generator 96 according to aspects of the present invention.

Figure 3:
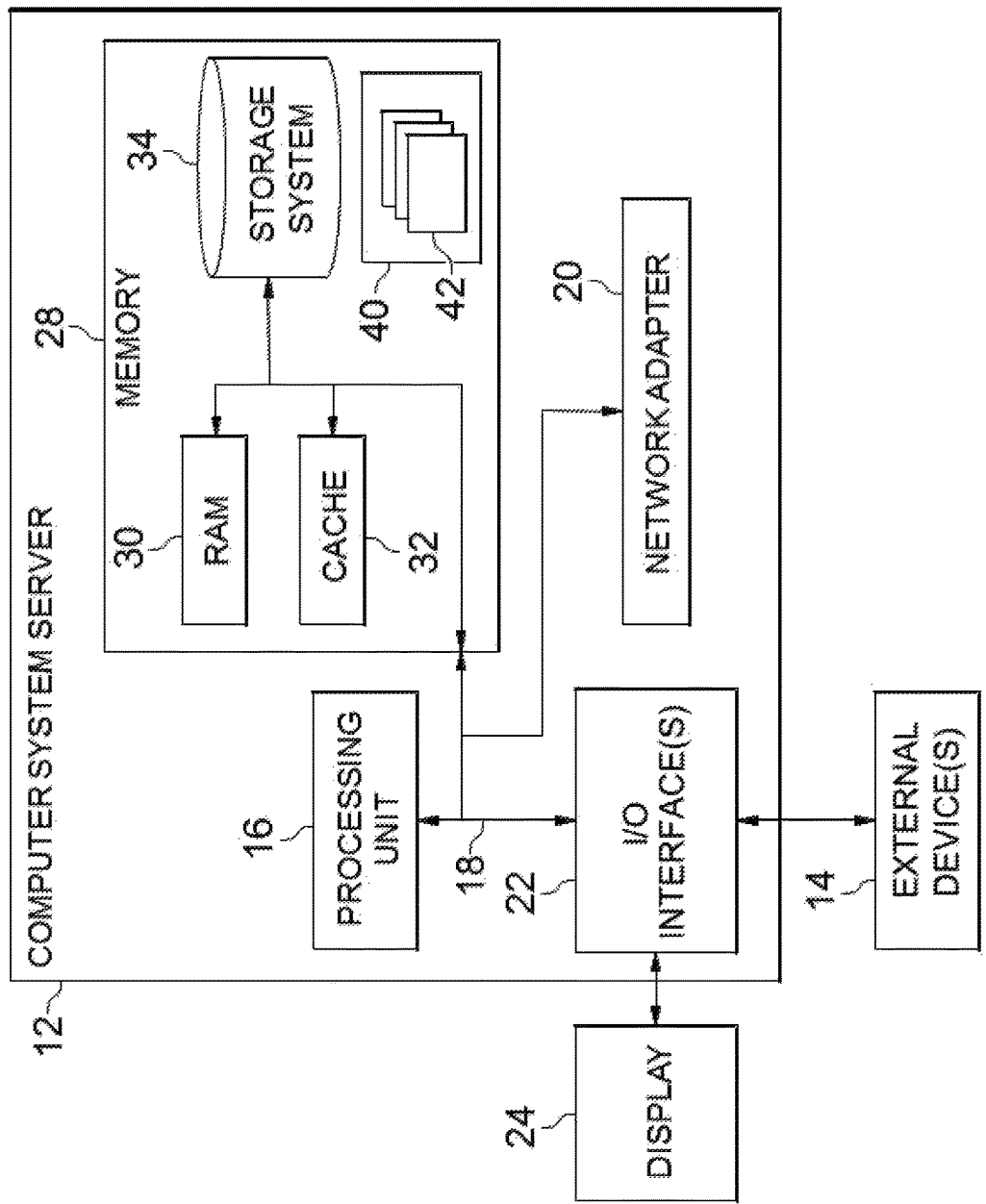
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
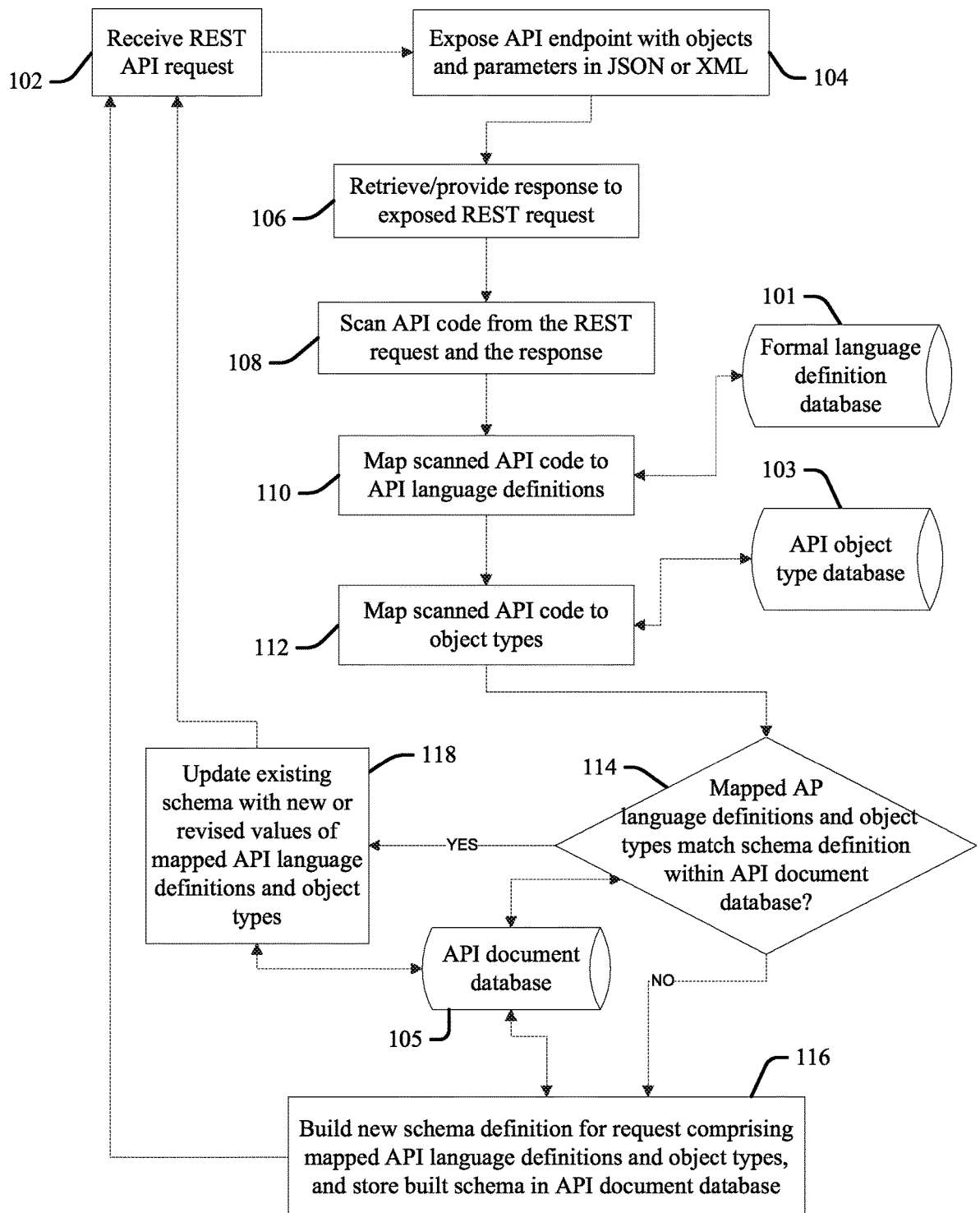
FIG. 4 is a flow chart illustration of an embodiment of the present invention.

FIG. 4 illustrates a method or process for an application programming interface document generator according to embodiments of the present invention. In response to receiving an input at 102 of a REST API request, at 104 a server-side processor configured according to an aspect of the present invention (the "configured processor") exposes an API endpoint with objects and parameters in JSON or XML format, and at 106 retrieves or otherwise provides an appropriate response to the exposed REST request.

At 108 the configured processor scans API code from the REST request input 102 and the response provided at 104.

At 110 the configured processor maps (matches) the scanned API code to one or more API language definitions within a formal language definition database 101. The mapped language definitions comprise sets of symbols, letters, or tokens from which the strings of the REST request and response language may be formed.

At 112 the configured processor maps (matches) the scanned API code to one or more object types within an API object type database 103, a data structure or cloud resource used to store or reference object-type data.

At 114 the configured processor determines whether the mapped API language definitions and object types match a schema definition within an API document database 105.

In response to determining at 114 that the mapped API language definitions and object types do not match a schema definition within the API document database 105, at 116 the configured processor builds a schema definition for the request 102 that comprises the API language definitions mapped at 110 and the object types mapped at 112, and stores the built schema definition to the API documentation database 105 in association with the request 102 in a readable format or form that is comprehensible to users.

In response to determining at 114 that the mapped API language definitions and object types matches an existing schema definition within the API document database 105, at 118 the configured processor compares the language definitions and object types of the matched, existing schema for consistency with the mapped API language definitions and object types, and thereby updates the existing schema in the API documentation database with values of the mapped API language definitions and object types that are not currently present within the existing schema (that re new or revised relative to current values) in the readable format of the updated schema 105, in association with the request 102.

The process iteratively returns to 102 from 116 and 118, to await new REST request inputs. Thereby, with each new REST input at 102 the configured processor dynamically responsively builds a new schema at 116 or revises or refines an existing schema at 118 to provide API documentation to enable appropriate processing, including CRUD processing, of objects within each REST request input 102. Thus, whenever a parameter input at 102 is submitted as an object wherein a schema definition is not previously defined within the API documentation database 105, a user need not manually modify API code on server to perform CRUD operations, but instead devices configured according to embodiments of the present invention automatically and autonomously modify the API code.

Figure 5:
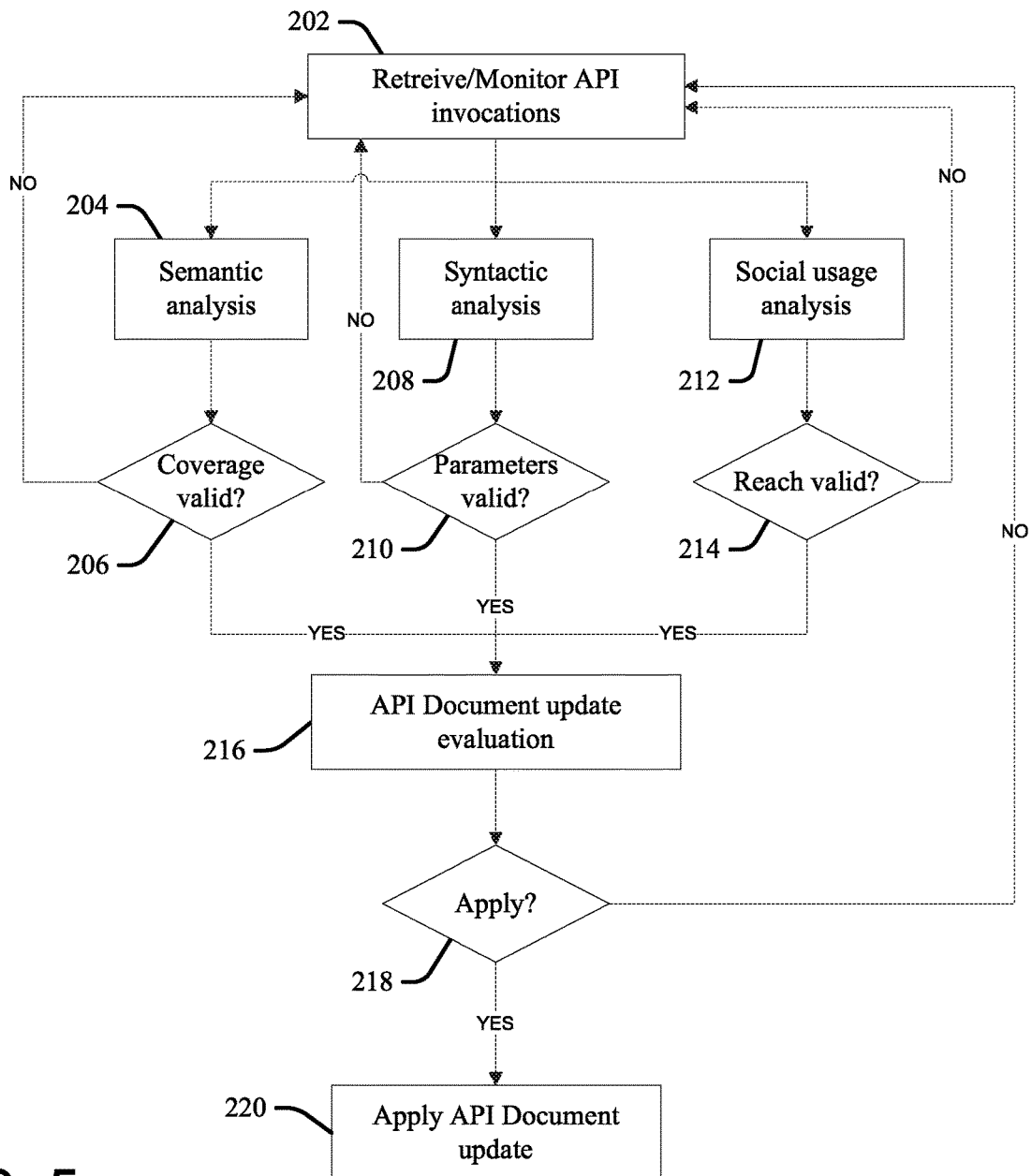
FIG. 5 is a flow chart illustration of another embodiment of the present invention.

FIG. 5 illustrates another embodiment of a method or process for an application programming interface document generator according to embodiments of the present invention. At 202 a server-side processor configured according to an aspect of the present invention (the "configured processor") retrieves and monitors the flow or REST API requests and their retrieved responses for API invocations with regard to objects and parameters in JSON or XML format.

The embodiment of FIG. 5 performs three different analyses. Thus, at 208 the configured processor performs a syntactic analysis on specific (syntactic) parameters related to the invocation and identified as missing from current schema, to determine if the syntactic parameters are well documented within other schema (for example, that they appear at least once, or with a threshold frequency or percentage within other schema for other REST request and response flows) and therefore valid at 210. In response to determining that they are well documented at 210, the configured processor passes the new parameters on to an API document update evaluation process at 216, in order to enrich the API documentation based on the calls and data provided. Alternatively, in response to determining that they are not well documented (the parameters are not validated) at 210, the configured processor returns to 202 for further flow analysis.

At 204 the configured processor performs semantic analysis on specific (semantic) parameters of the code values that are related to the invocation and identified as missing from current schema, in order to understand if the semantic parameters used in the invocation are well documented in other API documentations and referred to therein as API references, and therefore that the coverage is valid, at 206. In response to determining that their coverage is valid at 206, the configured processor passes the new semantic parameters on to the API document update evaluation process at 216. Alternatively, in response to determining that the coverage of said semantic parameters is not valid at 206, the configured processor returns to 202 for further flow analysis. In one example the configured processor determines via semantic analysis at 204 whether the semantic parameters are mandatory, optional or unexpected within the other API documentations: if determined to be mandatory or optional, their coverage is determined to be valid at 206 and they are passed on to the API document update evaluation process at 216; if determined to be unexpected, then they are determined to be not well documented at 206, and the configured processor returns to 202 for further flow analysis.

At 212 the configured processor performs a social usage analysis on social parameters of the mapped code values that are related to the invocation and identified as missing from current schema, in order to determine an amount or level of usage of the social parameters by users within other API request and response flows. More particularly, analyze comments by users on social network channels to determine levels or amounts of use of social parameters missing from current schema, in order to verify that a determined amount of usage satisfies a "valid reach" threshold amount at 214. Thus, in response to determining that the amount of usage of the social parameters meets a threshold minimum amount at 214, the configured processor passes the missing social parameters on to the API document update evaluation process for inclusion into built or updated schema at 216; alternatively, in response to determining that that the amount of usage of the social parameters does not meet a threshold minimum amount at 214, the configured processor returns to 202 for further flow analysis.

At 216 the configured processor evaluates (determines) whether or not to generate a new or updated schema API document, to understand when and how to apply changes to existing API documentation, as a function of the outputs of the decision processes at 206, 210 and 214 described above. Embodiments may require unanimous "yes" determinations at each of the decision processes at 206, 210 and 214 to move forward with applying changes to existing API documentation at 216; or they may require a majority of "yes" determinations (two); or determine a weighted score value for the respective "yes" or "no" decisions at each of the processes 206, 210 and 214, wherein some "yes" and "no" at each of 206, 210 and 214 are weighted and valued differentially with respect to each other, and wherein a total of the weighted values is compared to a threshold at 218, so that an API document is updated at 220 if the threshold is met at 218; otherwise the configured processor returns to 202 to continue to monitor flow activity.

The following is an illustrative but not limiting or exhaustive example of an API documentation enrichment according to embodiments of the present invention (including the processes of FIGS. 4 and 5), wherein an API needs a schema for defining some customer-based parameters that are not known in advance, but are instead defined at runtime by the customer/exploiter when defining for the first time dynamic parameters. Using a "POST" operation a customer dynamic schema is defined, and then using CRUD APIs the data is processed. (POST is a request method supported by HTTP that requests that a web server accepts data enclosed in the body of the request message, likely for storing it; it is often used when uploading a file or when submitting a completed web form.) When the API code is developed, a schema object is defined in a generic formal, for example:

```
{
    controlName: {
        type: String,
        required: true,
        unique: true,
        index: true,
    },
    controlType: {
        type: String,
        required: true,
    },
    ...
    ...
    controlDetails: {
        type: Object,
        required: true,
    }}
```

If in the schema object the parameter "(controlDetails)" is defined as an object, aspects of the present invention determine API documentation for the parameter by processing the code of the request and response flow, and thereby determine the following API documentation:

```
"controlDetails" : {
    "customerEnvName" : {
        "type" : "String",
        "required" : true
    },
    "severity" : {
        "type" : "Number",
        "required" : true
    },
    "date" : {
        "type" : "Date",
        "required" : false
    }
}
```

More particularly, the aspects determine that valid data returned in the response flow to satisfy "customerEnvName" requests is always "string" data, resulting in setting the value of the "required" field as "true" within the API schema created for "customerEnvName" requests. Similarly, the aspects determine that valid data returned in the response flow always includes "severity" field data, resulting in setting the value of the "severity" field as "true"; and further that the data-type of the severity field is numeric, wherein the aspects signify this within the API documentation created or updated by setting the "required" field as "true" within the API schema. Lastly, the aspects determine that valid data returned in the response flow sometimes, but not invariably includes "date" data type values within "date" field data, and accordingly set the "required" field for the "data" data as "false" within the API schema.

Without the "customerEnvName," "severity" and "date" definitions the schema defined is not usable by the customer, wherein under the prior art these the API code and documentation definitions above must be manually created in order to perform CRUD operations. In contrast, aspects of the present invention understand parameter schemas needed by a user by parsing request objects provided, and automatically create APIs to enable GET, POST, DELETE and UPDATE processing of the request and result, and creating the related documentation as a function of the schema.

Thus, when a user starts to use the API the aspects cognitively interpret the code within the flow and the response codes of the server, to autonomously improve details in the documentation. For example, in analyzing the flow of responses returned in satisfaction of a "curl" request for "date" data, aspects of the present invention recognize that the responses within the flow are always of the format "yyyymmdd," and never "yyyy-dd-mm," and thereby create API documentation that indicates that valid response data is always (limited to) numeric type (with no punctuation or other string-type data) and limited in size or length to eight numeric characters ("required: true").

API documentation that explains what an API does, and how, is generally created manually by users in prior art implementations. Such manually-created documents may not be exhaustive, but instead fail to provide good examples of operation or otherwise suffer from omissions. Manually-created API documentation, or updates thereof, via prior art approaches also require significant expenditures of time and/or associated costs. API documentation must be also changed to be related on a latest version of an API, which may delay release of the latest versions. Further, to store an object inside a database under the prior art a user must manually define a schema object with information for all parameters: if an object is provided via API and the schema object is not defined, it will not be stored, causing a mandatory change of the API code.

In contrast, aspects of the present invention provide methods, process and devices that dynamically produce API documentation by analyzing implementation code and network response code flow when an API is used. Thus, including in the aspects of FIGS. 4 and 5 described above, when a user submits a REST API request, the server-side processor exposes the API endpoint with object parameters in JSON or XML format, thereby exposing the API, and provides an appropriate response to the user request. The configured processor defines an engine that dynamically scan the API code and the API response, and starts a cognitive process that builds API documentation, checking in the formal language definition database and in the objects types database for useful mappings stored therein that can be applied to the scan, and to further build a schema definition, or, if one already exists, to check the schema for consistency. Thus, if a parameter is submitted as object and the schema definition is not previously defined, the user does not have to modify the API code on server, but instead the API documentation is automatically updated by the aspect, providing API documentation in a readable format that can be readily understood by a user. The aspects determine and recognize changes in API code every time that the API is called, and live-update the documentation in real-time, whenever the API is called, wherein autonomous API documentation updating is responsive to and relies upon intercepted network flow that contains useful information used to better understand the API context.

It is further noted that some prior art teachings teach the generation of documentation for an application or web service, such as a web application programming interface (API), by analyzing bytecode for an application itself, wherein metadata contained within the bytecode and that specifies the functionality of the web service is extracted and used as a template and basis for documentation, and wherein a second source of documentation that contains detailed documentation of the web service is contributed by the web service developer and merged with the metadata extracted from the bytecode. This prior art approach does not optimize API documentation from code extracted from the flow of requests and responses, and such a prior art approach is deficient in properly understanding how the API works, wherein API document descriptions generated solely from application code and related API documentation cannot provide the API document generation and updates achieved by aspects of the present invention.

The terminology used herein is for describing aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising executing on a computer processor:

scanning application programming interface code from a representational state transfer request, and from a server-side response that is retrieved in satisfaction to the representational state transfer request;

mapping a matching application programming interface language definition within a formal language definition database to matching language definition code values within the scanned application programming interface code;

mapping a matching object type within an application programming interface object type database to matching object code values within the scanned application programming interface code;

in response to determining that the matching application programming interface language definition and the matching object type are not included within any schema definition within an application programming interface code document database, building a built schema definition for the representational state transfer request that comprises the matching application programming interface language definition and the matching object type, and storing the built schema definition to the application programming interface code document database;

in response to determining that the matching application programming interface language definition and the matching object type are included within an existing one of the schema definitions within the application programming interface code document database, updating the existing schema definition with code values of the matching object code values and the matching language definition code values that are not currently present within the existing schema definition;

in response to determining at least two of a set of determinations, storing the built schema definition or the updated existing schema definition in a storage format that is readable to a user, wherein the set of determinations comprises:

determining that syntactic parameters of the matching object code values and the matching language definition code values appear with a threshold frequency within the application programming interface code document database schemas;

determining that semantic parameters of the matching object code values and the matching language definition code values within the application programming interface code document database schemas are selected from a mandatory value and an optional value; and determining that social parameters of the matching object code values and the matching language definition code values appear with a threshold frequency within comments on a social network channel.

2. The method of claim 1, wherein the scanning the application programming interface code from the representational state transfer request comprises:

exposing an application programming interface endpoint with objects and parameters in a format that is selected from the group consisting of a JAVASCRIPT object notation format and an extensible markup language format.

3. The method of claim 1, wherein the mapped application programming interface language definition comprises elements from which strings of language of the representational state transfer request and the server-side response are formed and that are selected from the group consisting of symbols, letters, and tokens.

4. The method of claim 1, wherein the built schema definition and the updated existing schema definition enable create, read, update and delete processing of an object within the representational state transfer request.

5. The method of claim 1, further comprising:

integrating computer-readable program code into a computer system comprising a processor, a computer readable memory in circuit communication with the processor, and a computer readable storage medium in circuit communication with the processor; and wherein the processor executes program code instructions stored on the computer-readable storage medium via the computer readable memory and thereby performs the scanning the application programming interface code from the representational state transfer request and from the server-side response retrieved in satisfaction to the representational state transfer request, the mapping the matching application programming interface language definition within the formal language definition database to the matching language definition code values within the scanned application programming interface code, the mapping the matching object type within the application programming interface object type database to the matching object code values within the scanned application programming interface code, the building the built schema definition, the storing the built schema definition to the application programming interface code document database, the updating the existing schema definition with code values of the matching object code values and the matching language definition code values that are not currently present within the existing schema definition, and the storing the built schema definition or the updated existing schema definition in the storage format that is readable to the user in response to determining the at least two of the set of determinations.

6. The method of claim 5, wherein the computer-readable program code is provided as a service in a cloud environment.

7. A system, comprising:
a processor;
a computer readable memory in circuit communication with the processor; and
a computer readable storage medium in circuit communication with the processor;

wherein the processor executes program instructions stored on the computer-readable storage medium via the computer readable memory and thereby:

scans application programming interface code from a representational state transfer request, and from a server-side response that is retrieved in satisfaction to the representational state transfer request;

maps a matching application programming interface language definition within a formal language definition database to matching language definition code values within the scanned application programming interface code;

maps a matching object type within an application programming interface object type database to matching object code values within the scanned application programming interface code;

in response to determining that the matching application programming interface language definition and the matching object type are not included within any schema definition within an application programming interface code document database, builds a built schema definition for the representational state transfer request that comprises the matching application programming interface language definition and the matching object type, and stores the built schema definition to the application programming interface code document database;

in response to determining that the matching application programming interface language definition and the matching object type are included within an existing one of the schema definitions within the application programming interface code document database, updates the existing schema definition with code values of the matching object code values and the matching language definition code values that are not currently present within the existing schema definition; and in response to determining at least two of a set of determinations, stores the built schema definition or the updated existing schema definition in a storage format that is readable to a user, wherein the set of determinations comprises:

determining that syntactic parameters of the matching object code values and the matching language definition code values appear with a threshold frequency within the application programming interface code document database schemas;

determining that semantic parameters of the matching object code values and the matching language definition code values within the application programming interface code document database schemas are selected from a mandatory value and an optional value; and determining that social parameters of the matching object code values and the matching language definition code values appear with a threshold frequency within comments on a social network channel.

8. The system of claim 7, wherein the processor executes the program instructions stored on the computer-readable storage medium via the computer readable memory and thereby scans the application programming interface code from the representational state transfer request by exposing an application programming interface endpoint with objects and parameters in a format that is selected from the group consisting of a JAVASCRIPT object notation format and an extensible markup language format.

9. The system of claim 7, wherein the mapped at least one application programming interface language definition comprises elements from which strings of language of the representational state transfer request and the server-side response are formed and that are selected from the group consisting of symbols, letters, and tokens.

10. The system of claim 7, wherein the built schema definition and the updated existing schema definition enable create, read, update and delete processing of an object within the representational state transfer request.

11. A computer program product for an application programming interface document generator, the computer program product comprising:
a computer readable storage medium having computer readable program code embodied therewith, wherein the computer readable storage medium is not a transitory signal per se, the computer readable program code comprising instructions for execution by a processor that cause the processor to:
scan application programming interface code from a representational state transfer request, and from a server-side response that is retrieved in satisfaction to the representational state transfer request;
map a matching application programming interface language definition within a formal language definition database to matching language definition code values within the scanned application programming interface code;
map a matching object type within an application programming interface object type database to matching object code values within the scanned application programming interface code;
in response to determining that the matching application programming interface language definition and the matching object type are not included within any schema definition within an application programming interface code document database, build a built schema definition for the representational state transfer request that comprises the matching application programming interface language definition and the matching object type, and store the built schema definition to the application programming interface code document database;
in response to determining that the matching application programming interface language definition and the matching object type are included within an existing one of the schema definitions within the application programming interface code document database, update the existing schema definition with code values of the matching object code values and the matching language definition code values that are not currently present within the existing schema definition; and
in response to determining at least two of a set of determinations, store the built schema definition or the updated existing schema definition in a storage format that is readable to a user, wherein the set of determinations comprises:
determining that syntactic parameters of the matching object code values and the matching language definition code values appear with a threshold frequency within the application programming interface code document database schemas;
determining that semantic parameters of the matching object code values and the matching language definition code values within the application programming interface code document database schemas are selected from a mandatory value and an optional value; and
determining that social parameters of the matching object code values and the matching language definition code values appear with a threshold frequency within comments on a social network channel.

12. The computer program product of claim 11, wherein the computer readable program code instructions for execution by the processor further cause the processor to scan the application programming interface code from the representational state transfer request by exposing an application programming interface endpoint with objects and parameters in a format that is selected from the group consisting of a JAVASCRIPT object notation format and an extensible markup language format.

13. The computer program product of claim 11, wherein the mapped application programming interface language definition comprises elements from which strings of language of the representational state transfer request and the server-side response are formed and that are selected from the group consisting of symbols, letters, and tokens.

14. The computer program product of claim 11, wherein the built schema definition and the updated existing schema definition enable create, read, update and delete processing of an object within the representational state transfer request.

* * * * *